(12) United States Patent
Amini

(10) Patent No.: US 12,535,233 B2
(45) Date of Patent: Jan. 27, 2026

(54) PARTIALLY UNDERGROUND VENTILATION SYSTEM FOR HEATING, COOLING, AND RECIRCULATING AIR OF A NEARBY FACILITY

(71) Applicant: Adib Amini, Ames, IA (US)

(72) Inventor: Adib Amini, Ames, IA (US)

(*) Notice: Subject to any disclaimer, the term of this patent is extended or adjusted under 35 U.S.C. 154(b) by 436 days.

(21) Appl. No.: 18/162,168

(22) Filed: Jan. 31, 2023

(65) Prior Publication Data

US 2023/0243530 A1 Aug. 3, 2023

Related U.S. Application Data

(60) Provisional application No. 63/267,341, filed on Jan. 31, 2022.

(51) Int. Cl.
*F24F 7/10* (2006.01)

(52) U.S. Cl.
CPC ..................... *F24F 7/10* (2013.01)

(58) Field of Classification Search
None
See application file for complete search history.

(56) References Cited

U.S. PATENT DOCUMENTS

| | | | | |
|---|---|---|---|---|
| 2,793,509 A * | 5/1957 | Victor, I | ............ | F24F 5/0046 165/56 |
| 4,181,690 A * | 1/1980 | Neu | ............ | F24F 13/1486 261/36.1 |
| 5,261,251 A * | 11/1993 | Galiyano | ............ | G05D 23/19 62/238.7 |
| 5,997,619 A * | 12/1999 | Knuth | ............ | B01D 46/0038 55/385.2 |
| 6,709,198 B2 * | 3/2004 | Wachtel | ............ | A01G 25/06 405/51 |
| 8,047,905 B2 * | 11/2011 | Everett | ............ | F24F 5/005 165/45 |
| 11,778,958 B2 * | 10/2023 | Gordon | ............ | F24D 11/0285 165/45 |
| 2003/0228839 A1 * | 12/2003 | Ferlin | ............ | B08B 15/002 454/67 |
| 2006/0096639 A1 * | 5/2006 | Coogle | ............ | F24F 13/222 137/268 |
| 2009/0260776 A1 * | 10/2009 | Calamaro | ............ | F28D 20/0052 165/45 |

(Continued)

FOREIGN PATENT DOCUMENTS

FR 3041085 A1 * 3/2017 ............ F24F 5/005

OTHER PUBLICATIONS

"Stainless Steel 2-way Full Port Ball Valve", Assured Automation, 47 pages, www.assuredautomation.com.

(Continued)

*Primary Examiner* — Ko-Wei Lin
(74) *Attorney, Agent, or Firm* — McKee, Voorhees & Sease, PLC

(57) ABSTRACT

A ventilation system applies geothermal temperature stability for ventilation of air in facilities near outdoor spaces. For example, there are a large number of wastewater treatment facilities built or renovated each year, with significant work on ventilation. The ventilation system therefore has significant potential for application and improvement of infrastructure.

18 Claims, 12 Drawing Sheets

(56) References Cited

U.S. PATENT DOCUMENTS

| | | | | |
|---|---|---|---|---|
| 2010/0015906 | A1* | 1/2010 | Takahashi | F24F 11/81 454/258 |
| 2010/0025008 | A1* | 2/2010 | Walford | F28F 17/005 165/45 |
| 2010/0078492 | A1* | 4/2010 | Cislo | F24F 11/0001 236/49.3 |
| 2011/0005151 | A1* | 1/2011 | Krecke | F24F 5/0017 454/238 |
| 2012/0261091 | A1* | 10/2012 | Krecke | F24F 12/006 165/56 |
| 2013/0045671 | A1* | 2/2013 | Apple | F24F 11/0001 454/239 |
| 2014/0150175 | A1* | 6/2014 | Hekster | A47K 3/286 4/597 |
| 2015/0377523 | A1* | 12/2015 | Ziegenfuss | E02D 27/32 52/741.15 |
| 2016/0169211 | A1* | 6/2016 | Tahara | F28D 7/12 60/641.2 |
| 2019/0113221 | A1* | 4/2019 | Huang | F04D 25/088 |
| 2019/0368273 | A1* | 12/2019 | Guerra | E21B 10/28 |
| 2020/0132384 | A1* | 4/2020 | De Cunha Maluf | F03G 7/04 |
| 2020/0141596 | A1* | 5/2020 | Caron | F24F 5/005 |

OTHER PUBLICATIONS

Daikin, "1.5-Ton Wall Mounted Heat Pump System", Data Sheet, 9 pages, May 2017.
Engineered Air, "Air Handling Unit" Data Sheet, 8 pages, Jan. 31, 2018.
Camfil, "Type 8 Built-up Bank Filter Holding Frame", Data sheet, 3 pages, Dec. 22, 2017.
Siemens, "Flowrite: 599 Series Rack & Pinion Valves", Technical Instructions, 24 pages, Jul. 15, 2009.
Innovent"Air Handling Equipment", Installation, Operation and Maintenance Manual, 218 pages, Mar. 2014.
United Enertech, "High Performance 6" Fixed Louver", Submittal Data, 1 page, Jul. 2010.
McGill Airflow LLC, "Uni-Flange Connector", Data Sheet, 5 pages, Mar. 7, 2018.
Nailor Industries, Inc., "Aluminum Supply Grilles & Registers", Data Sheet, 2 pages, Feb. 1, 2011.
National Fire Protection Association, "NFPA 820: Standard for Fire Protection in Wastewater Treatment and Collection Facilities", 63 pages, 2020.
Detroit Radiant Products Company, "HL3 Series: Re-Verber-Ray, Radiant Gas Heaters", Product Sheets, 8 pages.
United Enertech, "Thermal Broken Damper", Submittal Data, 2 pages, Feb. 2011.

* cited by examiner

PARTIALLY UNDERGROUND VENTILATION SYSTEM FOR HEATING, COOLING, AND RECIRCULATING AIR OF A NEARBY FACILITY

CROSS REFERENCE TO RELATED APPLICATIONS

This application claims priority under 35 U.S.C. § 119 to provisional patent application U.S. Ser. No. 63/267,341, filed Jan. 31, 2022. The provisional patent application is herein incorporated by reference in its entirety, including without limitation, the specification, claims, and abstract, as well as any figures, tables, appendices, or drawings thereof.

FIELD OF THE INVENTION

The present invention relates generally to a system and/or corresponding methods of use and installation having infrastructural applications in at least the environmental, wastewater treatment, and manufacturing industries. More particularly, but not exclusively, the present invention relates to a partially underground ventilation system for heating, cooling, and recirculating air of a nearby facility.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Drinking water, wastewater, and other infrastructure facilities are critical to health and safety. Wastewater itself as well as a variety of chemicals and processes on site can generate combustible, explosive gases as well as gases that are extremely toxic, fatal, and odorless at high concentrations. Therefore, regulations dictate very specific air handling and ventilation requirements for these facilities, depending on the treatment process, building design, environmental considerations, etc.

The National Fire Protection Association (NFPA) issues fire codes and standards to regulate such spaces. Spaces such as Preliminary Treatment Buildings (Headworks), indoor secondary treatment without primary clarification, and the like are typically classified by NFPA 820 as Class I, Division 1, Group D if the space is enclosed and has no ventilation provided, as shown in Table 5.2.2 of NFPA 820. However, when twelve (12) air changes per hour are provided, the space is rated as a Class I, Division 2 space. Division 1 rated spaces are facilities that deal with flammable gases, vapors, and liquids. Division 2 rated spaces are facilities where flammable materials are handled/process but are not normally present in concentrations high enough to be ignitable. Furthermore, materials and equipment can be used in Division 2 spaces that are not allowed in Division 1 spaces. Therefore, it is common practice to provide twelve (12) air changes per hour. All of the air in the building must be replaced with fresh air every five (5) minutes. Such ventilation requirements incur high energy heating and cooling energy loads on drinking water facilities, wastewater facilities, etc.

Thus, there exists a need in the art for an apparatus which allows for meeting high ventilation requirements of such facilities while reducing energy requirements and costs.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide a ventilation system for spaces in water, wastewater, and other infrastructure facilities that may require significant amounts of ventilation while avoiding extreme hot or cold temperatures.

It is still yet a further object, feature, and/or advantage of the present invention to apply the ventilation system in unoccupied spaces which refers to spaces that are not lived in or occupied on a regular basis. Such spaces do not generally need to be heated or conditioned to seventy two degrees Fahrenheit (72° F.). Instead, it is more common to control the temperature so that the temperature remains between thirty five and one hundred degrees Fahrenheit (35-100° F.). An example of how this is conventionally achieved is by using indirect gas fired heating, often installed along with an energy recovery ventilator (ERV). Such systems can be expensive to install as well as expensive to operate, especially as energy prices continue to rise.

While not required, the ventilation system can have a hybrid configuration and can be operated in association with an heat recovery ventilation (HRV) or energy recovery ventilator (ERV) to provide further efficiencies, such as where doing so would further reduce energy usage and costs.

It is still yet a further object, feature, and/or advantage of the present invention to utilize geothermal temperature stability to semi-passively provide temperature-controlled air to a space at high air volumes without requiring significant energy usage, thereby allowing for low operating costs.

The ventilation system disclosed herein can be used in a wide variety of applications. For example, the ventilation system can apply geothermal temperature stability to a novel and non-obvious application to provide ventilation to water, wastewater, and other similar spaces.

It is still yet a further object, feature, and/or advantage of the present invention to install the ventilation system with multiple piping systems, fans, and the like to provide redundancy and bypass abilities.

It is preferred the apparatus be safe, cost effective, and durable. For example, the ventilation system can include air filters, condensate drain collectors, and/or pipe cleaning brushes. Pipes within the ventilation system can be adapted to resist thermal transfer, electric conductivity, and/or failure (e.g., cracking, crumbling, shearing, creeping) due to excessive and/or prolonged exposure to (a) harsh temperatures, (b) moisture, (c) dust, and/or (d) tensile, compressive, and/or balanced forces acting on the pipes.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of a ventilation system which accomplish some or all of the previously stated objectives.

Components and aspects of the ventilation system described can be used and/or sold in isolation and still accomplish at least some or all of the previously stated objectives.

Likewise, said components and aspects can be incorporated into other systems and/or methods which accomplish some or all of the previously stated objectives.

According to some aspects of the present disclosure, a partially underground ventilation system comprises at least one fluid inlet located in an outdoor space with ambient air, parallelly oriented pipes that are (a) being joined by at least flexible pipe, such as an elbow, (b) buried below ground at a depth within the earth at location where the ground temperature is between thirty-five and sixty-five degrees Fahrenheit (35° F.-65° F.) year-round, and (c) configured to route air from the fluid inlet to a fluid outlet from an outdoor space to a space to be ventilated, and an intake fan to pull said air through the pipes to the ventilated space such that heat is exchanged through walls of the pipes with the earth.

According to some additional aspects of the present disclosure, the ventilation system further comprises an above-ground bypass duct with direct ventilation to outside air without the need for exchanging heat prior to entry into the facility.

According to some additional aspects of the present disclosure, the ventilation system further comprises at least one fluid gate that allows air to be ventilated to bypass at least one sections of the pipes.

According to some additional aspects of the present disclosure, the pipes comprise a material selected from the group consisting of: (i) steel; (ii) polyvinyl chloride (PVC); (iii) ductile iron; and (iv) high density poly ethylene (HDPE), etc.

According to some additional aspects of the present disclosure, each of the pipes comprise a diameter of between three (3) and two hundred and forty (240) inches and/or a length of between five (5) and ten thousand (10000) feet.

According to some additional aspects of the present disclosure, at least two of the parallelly oriented pipes are horizontally oriented and said depth comprises between two (2) and five hundred (500) feet because the pipes are buried underground. The decision whether to employ horizontal versus vertical pipes choice can be influenced by site conditions, soil type, existing structures, etc.

According to some additional aspects of the present disclosure, at least two of the parallelly pipes are vertically oriented and at least one portion of said pipes reaches a depth of at least twenty (20) feet underground.

According to some additional aspects of the present disclosure, the ventilation system further comprises a pipe cleaning brush.

According to some additional aspects of the present disclosure, the ventilation system further comprises an exhaust fan to return at least some air within the facility to the environment, wherein a type of the intake fan and a type of the exhaust fan are selected from the group consisting of: (i) axial flow; and (ii) cross-flow.

According to some other aspects of the present disclosure, a method for ventilating air comprises intaking air from the environment using a fan, passing said air through pipes buried beneath earth having a year-round temperature of between thirty five degrees Fahrenheit (35° F.) and sixty-five degrees Fahrenheit (65° F.) for a length such that heat exchanged through the pipe walls with the surrounding earth will heat and/or cool the air to a temperature within a range of thirty five degrees Fahrenheit (35° F.) to one-hundred degrees Fahrenheit (100° F.), delivering said air of the temperature within the said range to a nearby building to be ventilated, and returning at least some air within the building to the environment.

According to some additional aspects of the present disclosure, the method further comprises automatically operating the ventilation system with direct ventilation when outdoor air is above freezing.

According to some additional aspects of the present disclosure, the method further comprises sensing a temperature of the air within the building.

According to some additional aspects of the present disclosure, the method further comprises completely changing the air within the facility at least once every twenty four (24) hours, and more preferably, at least once every five minutes.

According to some additional aspects of the present disclosure, the method further comprises installing the pipes using a step selected from the group consisting of: (i) directional drilling; and (ii) trench installation.

According to some additional aspects of the present disclosure, the method further comprises collecting and/or removing water and/or preventing mold growth.

According to some additional aspects of the present disclosure, the method further comprises fireproofing the ventilation system.

According to some additional aspects of the present disclosure, the method further comprises when outdoor air is below freezing, said air by passing through the pipes will be heated to an acceptable temperature for the ventilated space with or without use of indirect gas fired heating, electrical heating, propane heating, air conditioning, heat recovery ventilation (HRV), or an energy recovery ventilator (ERV).

According to some additional aspects of the present disclosure, the method further comprises filtering the air prior to delivering said air of the temperature within the said range to a nearby building to be ventilated.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 7 shows the dampers in a fully open position. FIG. 8 details a jamb of the dampers.

FIG. 9 shows a detailed view of the grille, while FIGS. 10A-10C show various examples of registers that can be employed in combination with the grille of FIG. 9.

FIG. 16 shows a front view of the series rack and pinion valves. FIG. 17 shows a side view thereof. FIG. 18 shows a detailed view of an actuator of the series rack and pinion valves of FIGS. 16-17. FIG. 19 shows a two-way female NPT×female NPT (F×F) valve that can be implemented with the series rack and pinion valves of FIGS. 16-17. FIG. 20 shows a three-way female NPT× female NPT (F×F) valve that can be implemented with the series rack and pinion valves of FIGS. 16-17.

FIG. 22 shows the louver in detail. FIG. 23 shows the louver of FIG. 22 implemented with an optional flange. FIG. 24 shows the louver of FIG. 22 implemented with an optional glazing adapter. FIG. 25 shows the louver of FIG. 22 implemented with an optional extended sill.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
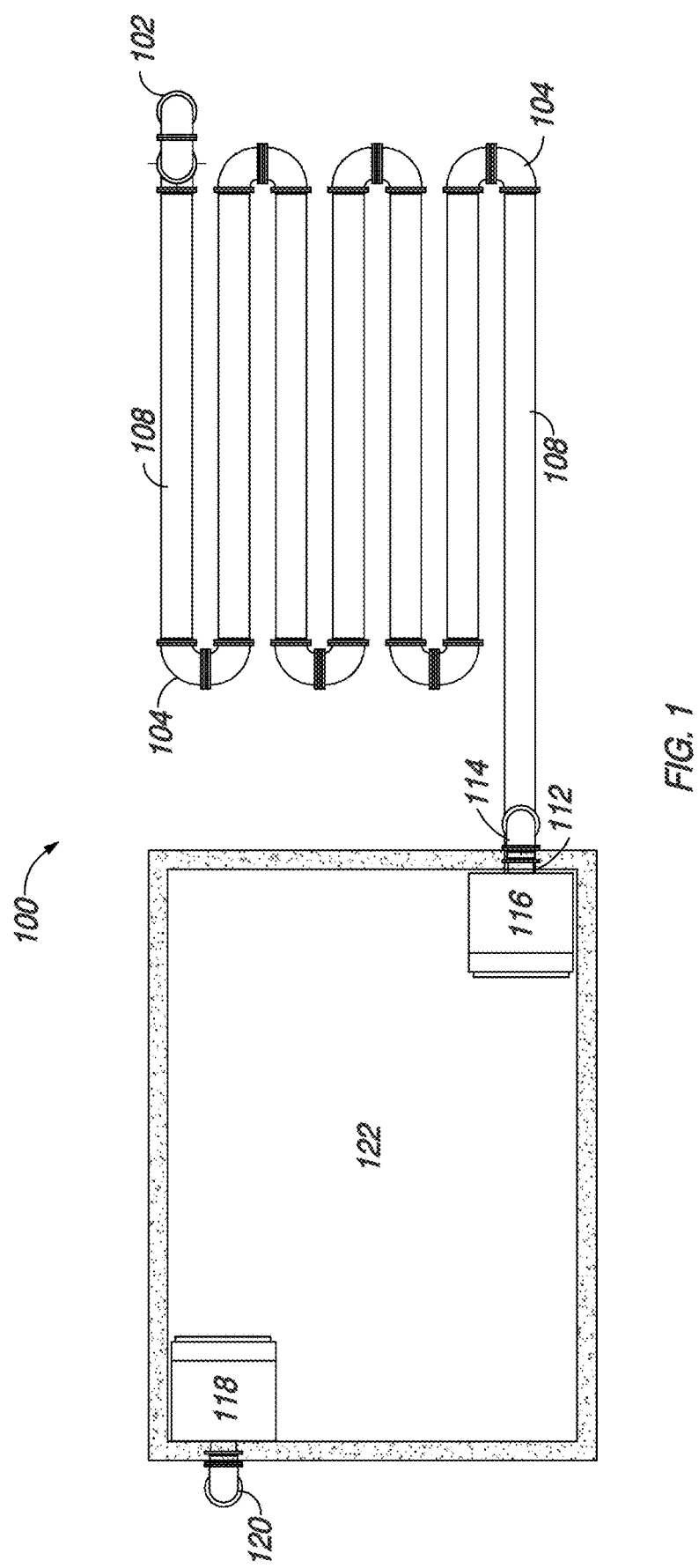
FIG. 1 shows a top plan view of a partially underground ventilation system for heating, cooling, and recirculating air of a nearby facility.
Figure 2:
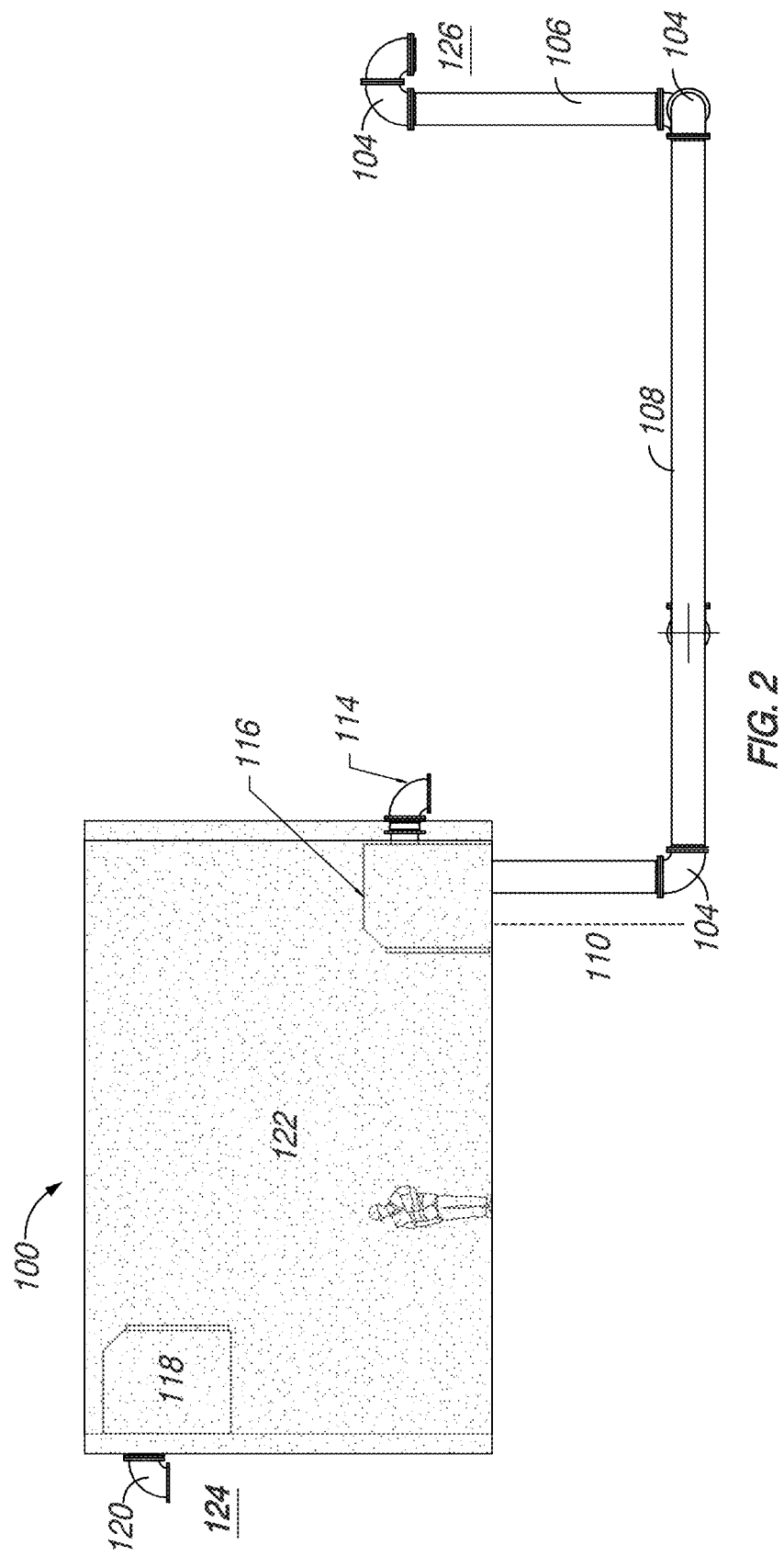
FIG. 2 shows a front plan view of the partially underground ventilation system of FIG. 1.

FIGS. 1-2 show a ventilation system 100 meeting high ventilation requirements of for facilities needing to be ventilated (e.g. once every five minutes) while still reducing energy requirements and costs.

More particularly, the ventilation system 100 includes at least one fluid inlet 102 that can take in fresh air, e.g., ambient air, from an outdoor space 126. Then at least one fluid inlet 102 can be positioned at one end of a system of pipes having flexible pipes or connectors 104, such as elbows, vertically oriented pipes 106, and horizontally oriented pipes 108.

Where certain features can be, but are not required to be, shared by one or more of the vertically oriented pipes 106 and one or more horizontally oriented pipes 108, the vertically oriented pipes 106 and horizontally oriented pipes 108 are herein be collectively referred to as "pipes 106/108". Where certain features are applicable to the flexible pipes or connectors 104, the vertically oriented pipes 106, and the horizontally oriented pipes 108, this aggregate group may also be generically referred to herein as "ducts 104, 106, 108".

Most ventilation systems 100 will have a need for multiple underground pipes 106/108 and/or pipe sections, though there can exist some limited applications where only one underground pipe is needed.

Figure 3:
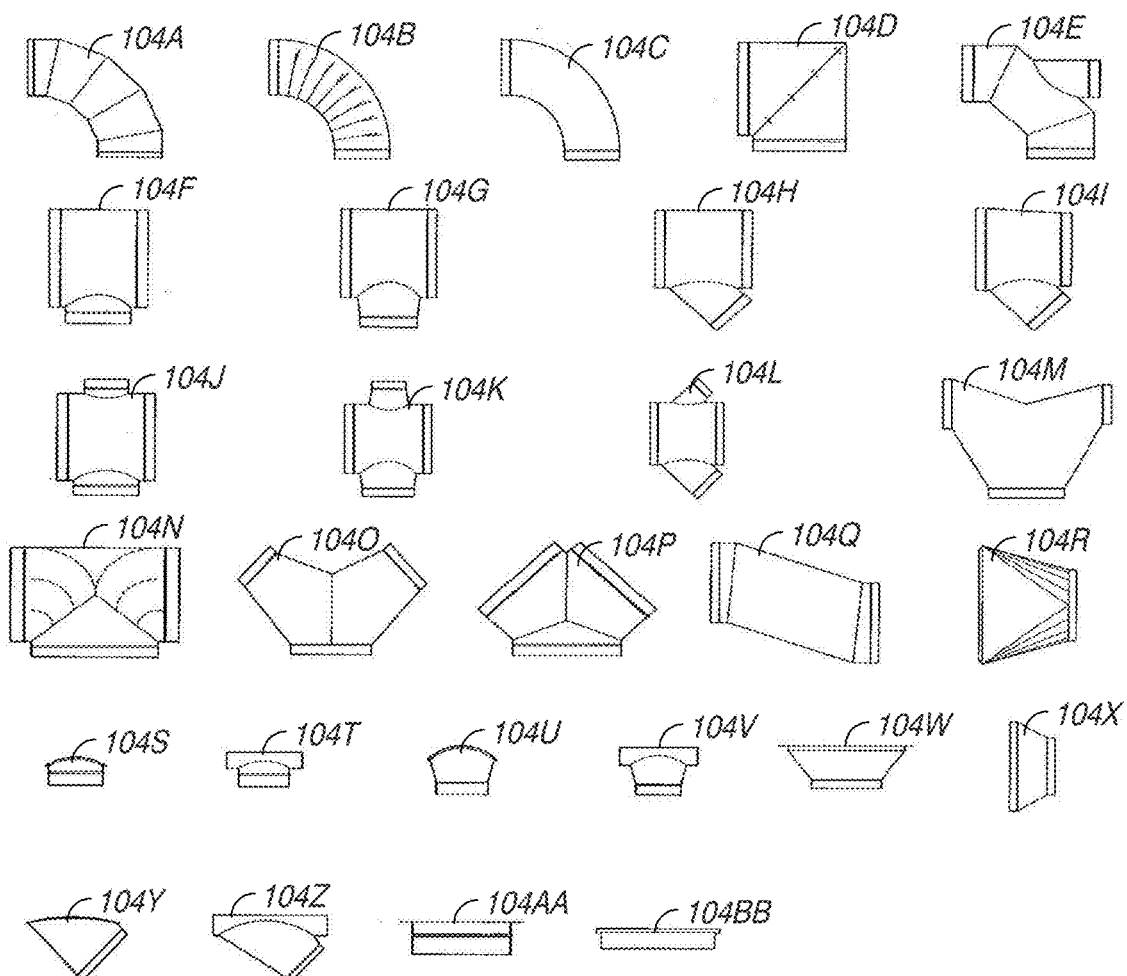
FIG. 3 shows non-limiting examples of duct sections that can be implemented within the ventilation system described herein, according to some aspects of the present disclosure.

Various examples of flexible pipes or connectors 104 are shown in FIG. 3, and include, but are not limited to: a gored elbow 104A, a pleated elbow 104B, a die-stamped elbow 104C, a mitered elbow with vanes 104D, a heel-tapped elbow 104E, a straight tee 104F, a conical tee 104G, a straight lateral 104H, a tapered lateral 104I, a straight cross 104J, a conical cross 104K, a lateral cross 104L, a vee 104M, a bullhead tee with vanes 104N, a tapered Y-branch 1040, a Y-branch 104P, an offset 104Q, a square-to-round 104R, a straight contour flanged tap 104S, a straight saddle tap 104T, a conical contour flanged tap 104U, a conical saddle tap 104V, a conical tap off flat 104W, a reducer 104X, a lateral contour flanged tap 104Y, a lateral saddle tap 104Z, a straight tap off flat 104AA, and a rectangular tap 104BB.

The pipes 106/108 can be laid and/or buried in close proximity with one another and joined by elbows 104. Air will travel through the pipes 106/108 for a fluid length of the piping system as a whole. The length will depend on the specific application, however it is to be appreciated a length of pipe(s) sufficient to allow for enough heat exchange with the surrounding earth to occur before entering an area to be ventilated at a desired temperature can help determine the length needed. According to some embodiments, the length of the pipes 106/108 is between five (5) and ten thousand (10000) feet, such that the pipes can be laid substantially near the facility itself. Where a higher length of pipe(s)

106/108 is used, some of the pipes 108 can be laid in parallel, horizontal orientation and joined with u-shaped elbows 104, as shown in FIG. 1. Other pipes 106 can help the ventilation system achieve the necessary depth and can be buried into the earth in vertical orientation, said pipes 106 being perpendicularly oriented to the parallel pipes 108, as shown in FIG. 2. Alternatively, the length of the pipes 106/108 is preferably between twenty five (25) and twenty five hundred (2500) feet, and in some other embodiments, between one hundred (100) and one thousand feet (1000). The diameter of the pipes can be between three (3) and two hundred and forty (240) inches and/or can be selected to best compliment said fluid length of the pipes 106/108.

The ability to exchange heat through the pipes 106/108 can further depend on the material being used in said pipes 106/108 and/or a diameter of the pipes. For example, the pipes 106/108 comprise a material selected from the group consisting of: (i) steel; (ii) polyvinyl chloride (PVC); (iii) ductile iron; and (iv) a high density poly ethylene (HDPE). Depending on the application, materials used can be and/or can be modified so as to be substantially fireproof. Where less space is available for burying pipes underground and the heat exchange must occur more rapidly between the pipes and the ground, the material selected can thus be selected appropriately.

Figure 4:
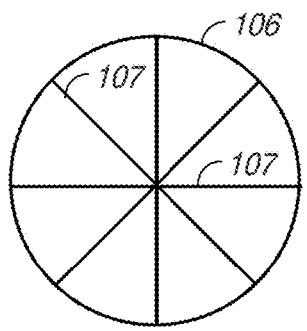
FIG. 4 shows a vertical, cross-sectional, elevation view of a horizontally oriented pipe that can be installed within the partially underground ventilation system of FIG. 1, with a particular emphasis on three exemplary plates that can be installed in the interior of the pipes.
Figure 5:
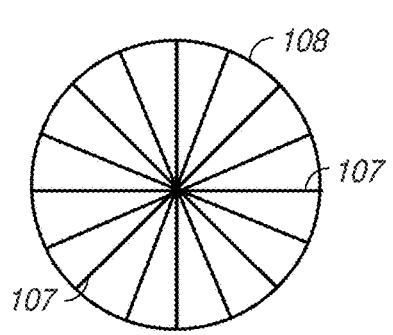
FIG. 5 shows a horizontal, cross-sectional of a vertically oriented pipe that can be installed within the partially underground ventilation system of FIG. 1, with a particular emphasis on eight exemplary plates that can be installed in the interior of the pipes.
Figure 6:
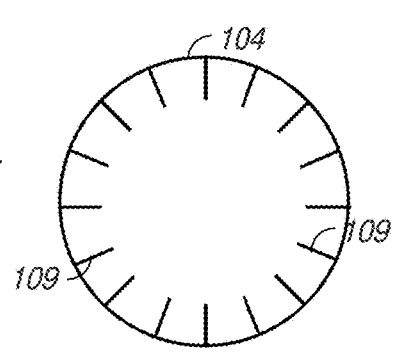
FIG. 6 shows an axial cross-sectional view of a flexible pipe or connector that can be installed within the partially underground ventilation system of FIG. 1, with a particular emphasis on sixteen fins that can be installed in the interior of the pipes, extending from a circumferential surface of said flexible pipe or connector to a center of same.

Still further, in some embodiments, such as those exemplified by FIGS. 4-6, the flexible pipes or connectors 104 and/or the pipes 106/108 can include plates 107, vanes, and/or fins 109 installed in the interior of the flexible pipes. The plates 107, vanes, and/or fins 109 are preferably symmetrically arrayed about a center of the flexible pipes or connectors 104 and/or the pipes 106/108. However, in some embodiments where a symmetric array of plates 107, vanes, and/or fins 109 needlessly obstructs airflow and/or is otherwise impractical to implement, asymmetric configurations for the plates 107, vanes, and/or fins 109 can be used. The plates 107, vanes, and/or fins 109 increase temperature exchange between walls of the flexible pipes or connectors 104 and/or pipes 106/108 and the air passing through the flexible pipes or connectors 104 and/or pipes 106/108. The plates 107, vanes, and/or fins 109 can extend radially inwardly from an outer surface of the flexible pipes or connectors 104 and/or pipes 106/108, which may be an outer circumferential surface (as shown in FIGS. 4-6).

In greater particularity, FIG. 4 shows a cross-section (horizontal plane) of a vertically oriented pipe 106, installed with three symmetrically arrayed plates 107. A similar setup can be used for a flexible pipe or connector 104 and/or for a horizontally oriented pipe 108. In the case of a horizontally oriented flexible pipe and/or connector 104 or a horizontally oriented pipe 108, the cross-section would be a vertical cross-section (similar to an elevation view) rather than a horizontal one.

It is appreciated that any number of plates 107 can be used on the interior of the pipe, depending on the application of the ventilation system 100. For example, FIG. 5 shows a cross-section (vertical plane) of a horizontally oriented pipe 108, installed with eight symmetrically arrayed plates 107. A similar setup can be used for a flexible pipe or connector 104 and/or for a horizontally oriented pipe 106. In the case of a horizontally oriented flexible pipe or connector 104 and/or a horizontally oriented pipe 106, the cross-section would be a horizontal cross-section (similar to a top plan or a bottom plan view) rather than a vertical one.

Alternatively, fins 109 which do not extend all the way through the center of the ducts 104, 106, 108 can be used. The fins 109 attach to the outer surface of the the ducts 104, 106, 108 and extend radially inwardly but do not extend all the way to the center of the the ducts 104, 106, 108.

The installation method of the pipes 106/108 will vary depending on environmental and site conditions as well as building ventilation requirements. Pipes 106/108 can be installed with directional drilling, trench installation, etc.

Figure 7:
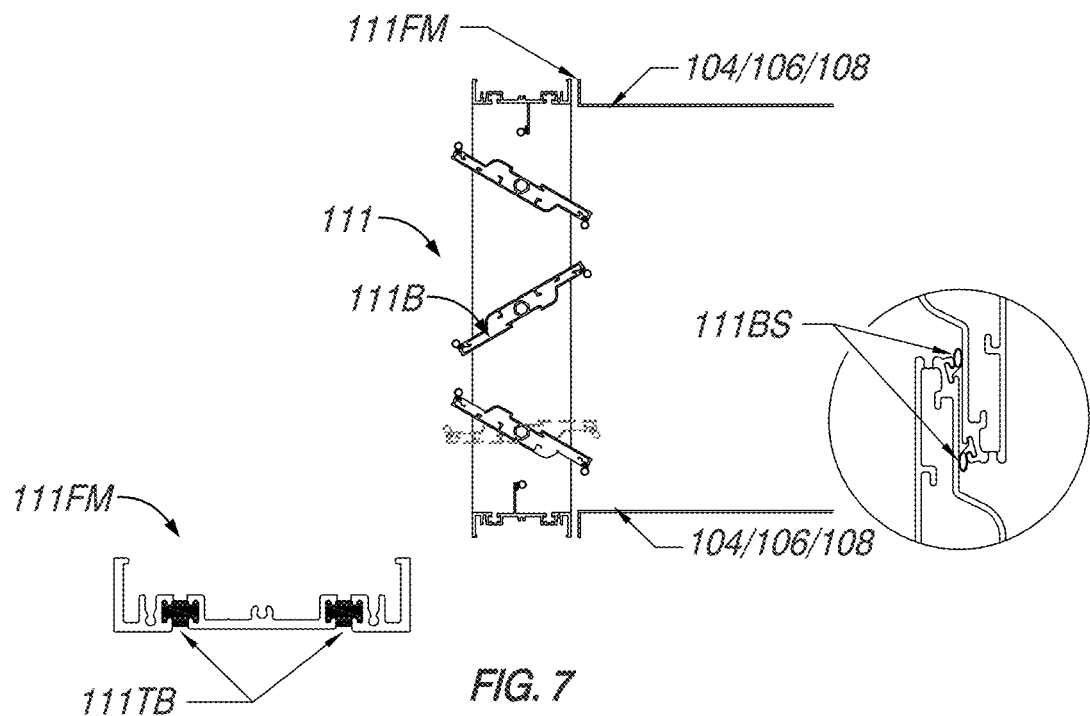
FIGS. 7-8 show a non-limiting example of dampers that can be implemented within the ventilation system described herein, according to some aspects of the present disclosure.
Figure 8:
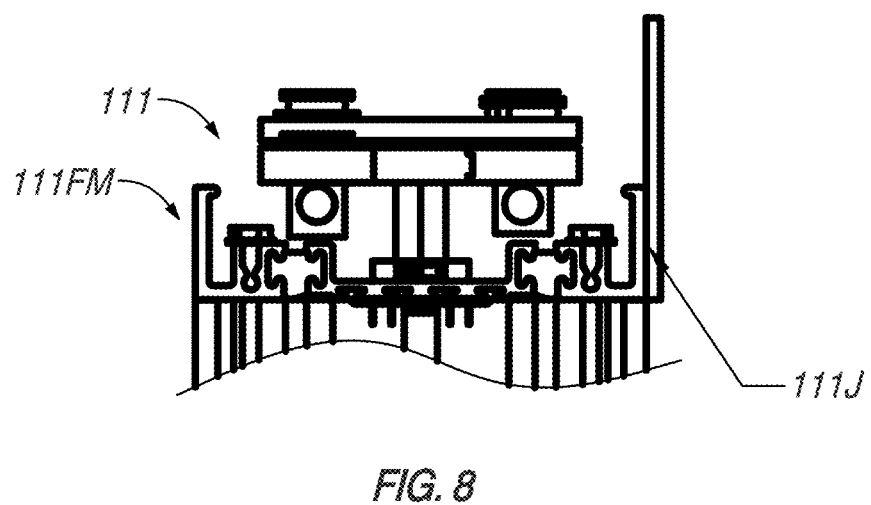
Figure 9:
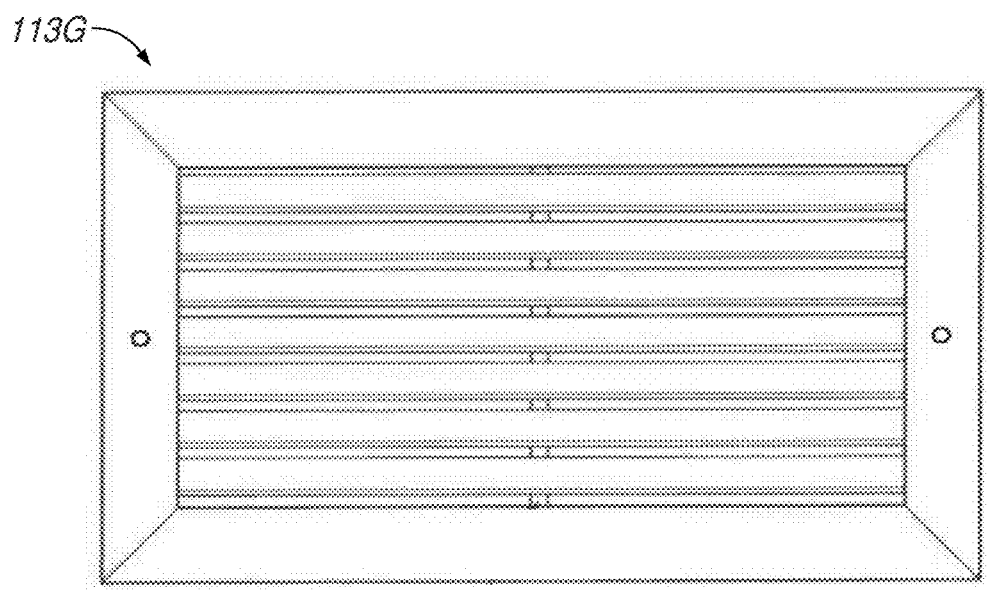
FIGS. 9 and 10A-10C shows a non-limiting example of grilles and registers that can be implemented within the ventilation system described herein, according to some aspects of the present disclosure.
Figure 10A:
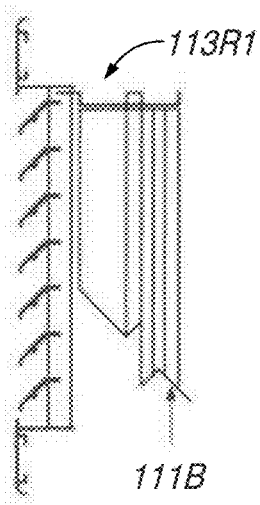
Figure 10B:
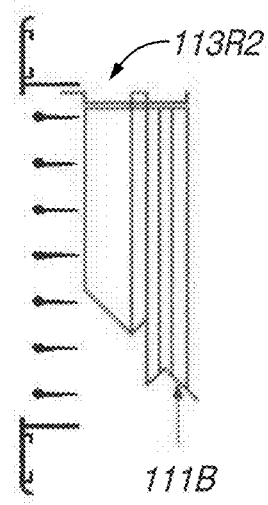
Figure 10C:
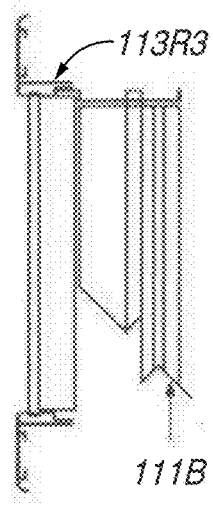

In at least one implementation of the ventilation system 100, the pipes 106/108 are buried below ground at a depth 110 within the earth at location where the ground temperature is between thirty-five and sixty-five degrees Fahrenheit (35° F.-65° F.) year-round. The system 100 can thus utilize geothermal temperature stability to semi-passively provide temperature controlled air to a space at high air volumes without requiring significant energy usage, thereby allowing for low operating costs. Dampers 111 can also be used to eliminate transfer of high heat or low cold penetrator and otherwise reduce condensation, as shown in FIGS. 7-8. The dampers 111 can include three blades 111B. The dampers 111 can be flange mounted via a flange-mount 111FM. Two flange mounts 111FM can be located at opposite surfaces of the ducts 104, 106, 108. The flange-mounts 111FM preferably include a pair of thermal breaks 111TB, as is shown in the detailed view on the lefthand side of FIG. 7. Said flange-mounts 111FM can be secured to the ducts 104, 106, 108 by way of a jamb 111J.

Such a depth 110, could be, for example, approximately twenty (20) feet, though can vary depending on how warm and/or cold the climate is in the area in which the pipes 106/108 are being buried. The pipes 106/108 are arranged to directly and/or indirectly route to a nearby building 122 from an outdoor space 126 after allowing the air to pass through the pipes which are located underground. As a result, by the time the pipes 106/108 route air from the fluid inlet 102 to the fluid outlet 112 at the outdoor space 126, significant heat exchange has occurred through walls of the pipes 106/108 with the surrounding earth. This can help regulate temperatures within the facility to the same range noted previously, or to an otherwise acceptable range for working conditions within the facility that is slightly broader than the previously noted range. Such a broader range, can be, but is not limited to being above thirty two degrees Fahrenheit and below one hundred degrees Fahrenheit (32° F.-100° F.).

To help control the flow of air from the fluid inlet 102 to the fluid outlet 112 at the outdoor space 126, grille(s) and/or registers can be employed at the fluid inlet 102 and/or the fluid outlet 112. FIGS. 9 and 10A-C show non-limiting example of grille(s) 113G and register(s) 113R1-R3 that can be implemented within the ventilation system 100. The registers 113R1-R3 can optionally include a dampening blade 113B. The grille(s) 113G and register(s) 113R1-R3 can also help prevent animals from entering the ducts 104, 106, 108.

When the outside area in the outdoor space 126 is already within an acceptable operating range direct ventilation can be employed. Such direct ventilation can be accomplished by way of a direct ventilation bypass duct 114 located on an external wall of the facility 122. This means air can be selectively brought in directly from outside without sending it through the below-ground pipes 106/108. In some embodiments, the grilles 113G and register(s) 113R1-R3 of FIGS. 9 and 10A-C are also employed at said direct ventilation bypass duct 114.

The need and/or opportunity for direct ventilation can be manually and/or automatically determined. Automatic determination means can include temperature sensors and thermocouples. In a further example, a single point duct temperature sensor can utilize a precision sensor encapsulated in a stainless steel probe and provides excellent heat transfer, fast response and resistance to moisture penetration.

During operation, when outdoor air is cold (e.g., below freezing), the air passing through the pipes 106/108 cam be heated to an acceptable temperature for the ventilated space (e.g., above freezing). Conversely, when outdoor air is very hot, the system can cool the air as it is provided to the ventilated space 122. Operating the system with direct ventilation reduces fan energy costs in the summer due to lower head pressure exerted on the system fan while also reducing condensation in the pipes. Direct ventilation can thus be used in cold climates where summers are temperate, as the air would be routed through the below-ground pipes when outdoor air is below freezing, but can switch to direct ventilation when outdoor air is above freezing. Likewise, in warm climates that do not reach below freezing, the system 100 can be run only in the summer. Therefore, the system has operational flexibility to meet a variety of conditions and needs.

Such a facility needing to be ventilated 122 can be, but is not limited to being waste, wastewater, and other infrastructure facilities that often require significant amounts of ventilation while avoiding extreme hot or cold temperatures. It is to be appreciated the ventilation system can be more efficient where the room and/or space to be ventilated 122 is not regularly inhabited and/or occupied by humans. In some embodiments, the ventilation system 100 can also be operated in association with a heat recovery ventilation (HRV) or energy recovery ventilator (ERV) to further reduce energy usage and costs, such as the ERV 115 of FIGS. 11-13.

Figure 11:
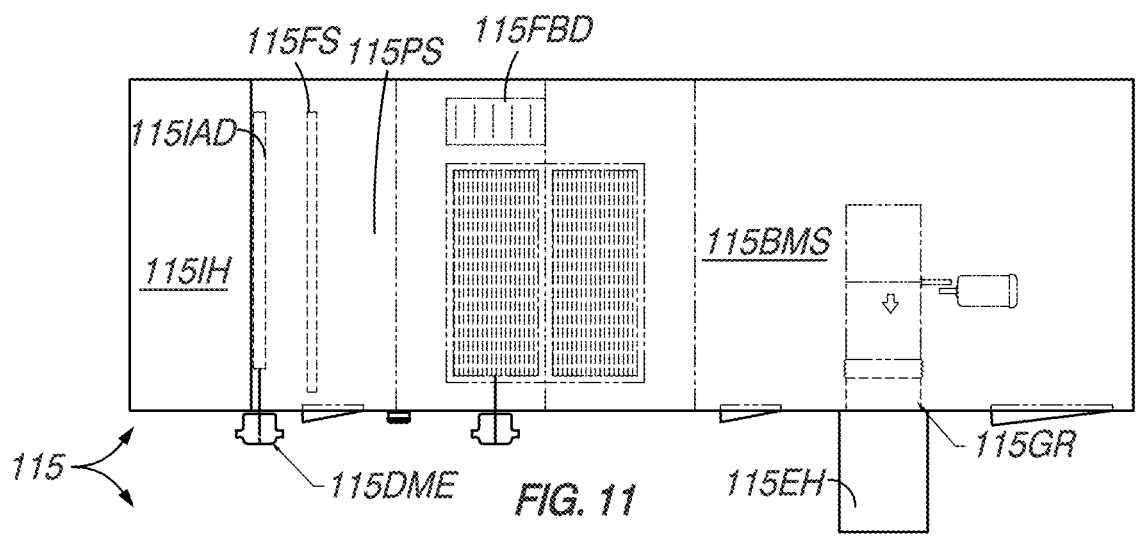
FIG. 11 shows a non-limiting example of an energy recovery ventilator (ERV) that can be implemented within the ventilation system described herein, according to some aspects of the present disclosure.
Figure 12:
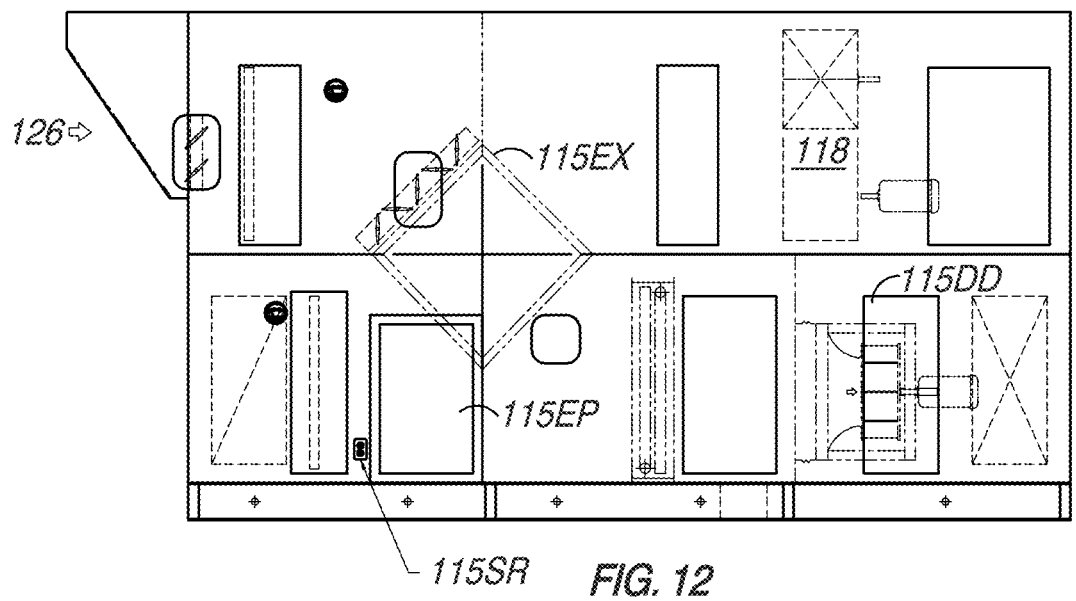
FIG. 12 shows further aspects of the non-limiting example of an energy recovery ventilator (ERV) of FIG. 11.
Figure 13:
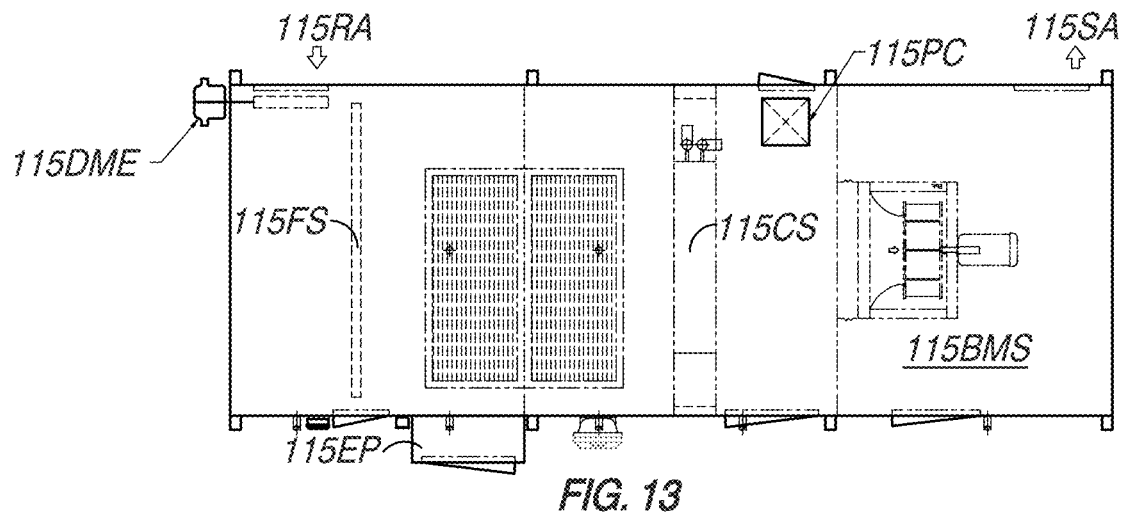
FIG. 13 shows even further aspects of the non-limiting example of an energy recovery ventilator (ERV) of FIG. 11.
Figure 14:
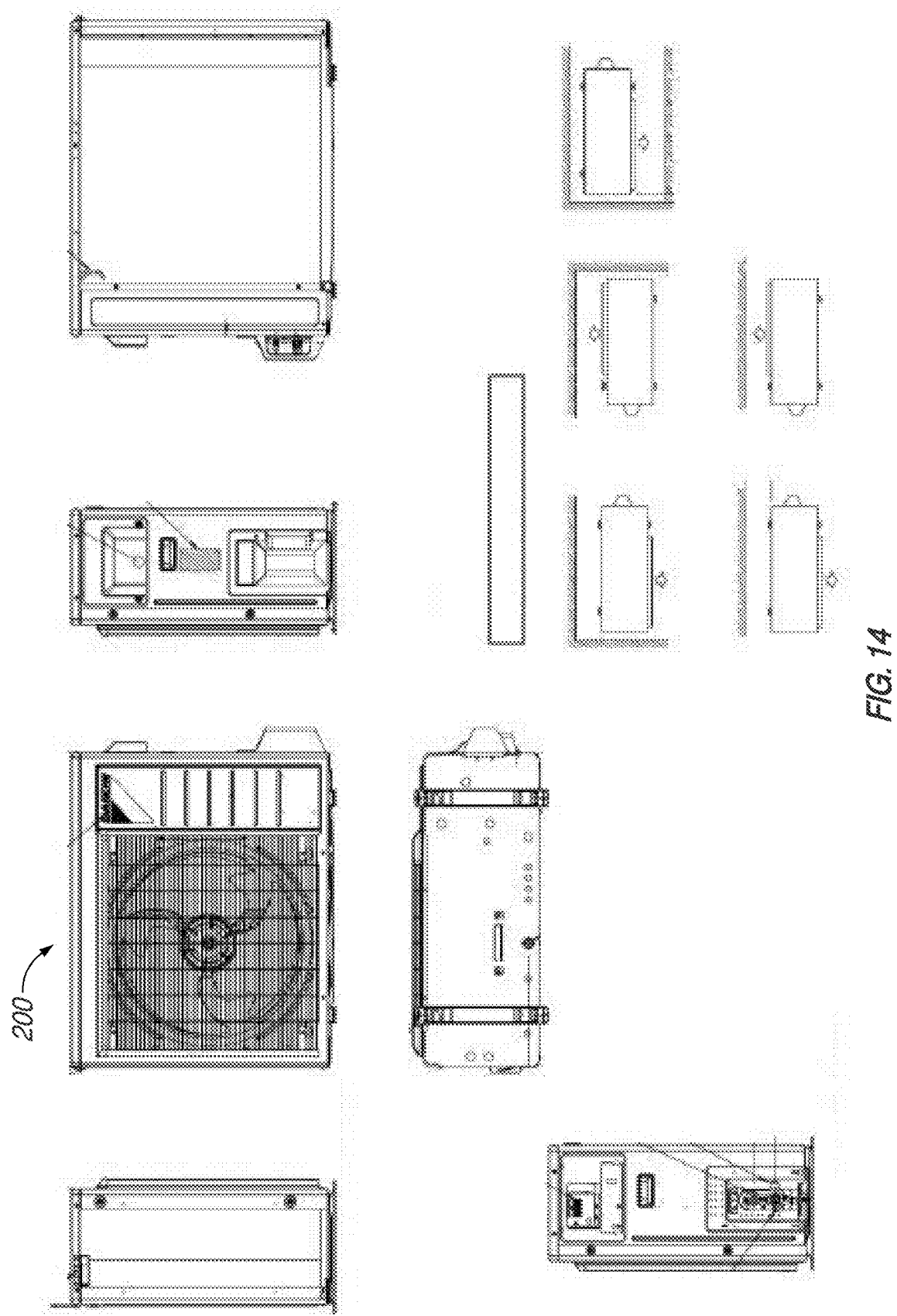
FIG. 14 shows a non-limiting example of a split system air conditioner and supplemental cooling system that can be implemented within the ventilation system described herein, according to some aspects of the present disclosure.
Figure 15:
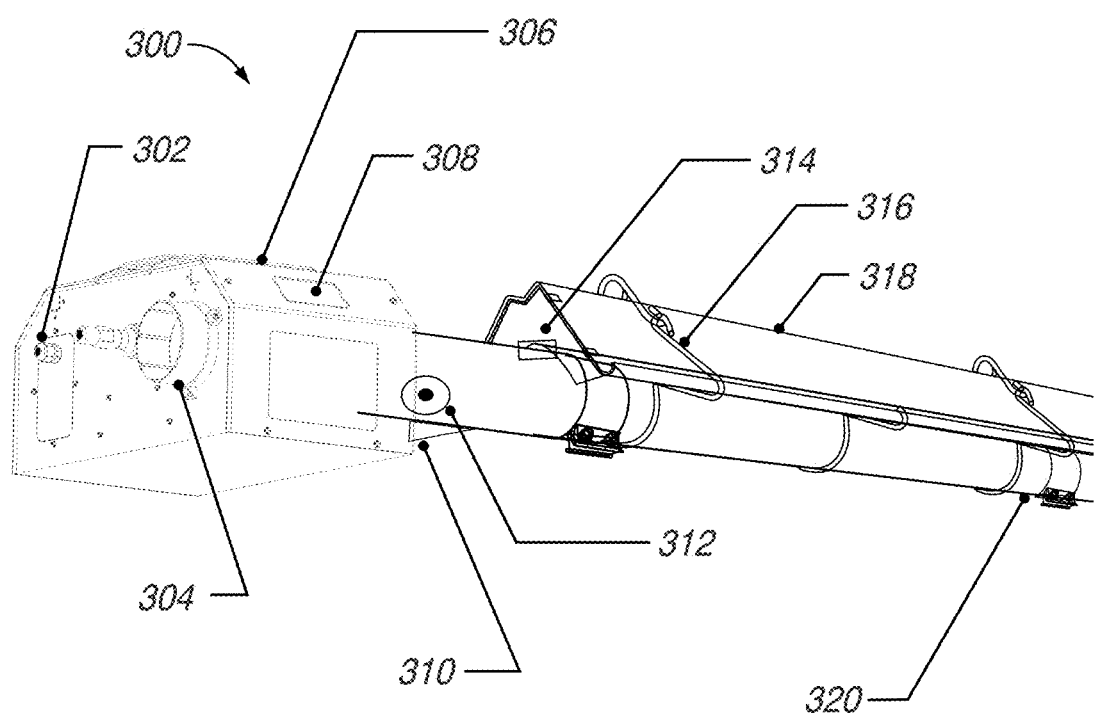
FIG. 15 shows a non-limiting example of infrared supplemental heating that can be implemented within the ventilation system described herein, according to some aspects of the present disclosure.
Figure 16:
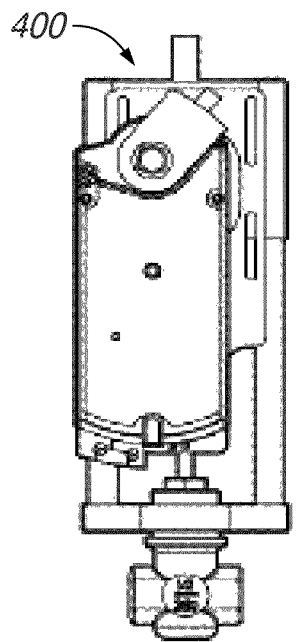
FIGS. 16-20 shows a non-limiting example of a series rack and pinion valves that can be implemented within the ventilation system described herein, according to some aspects of the present disclosure.
Figure 17:
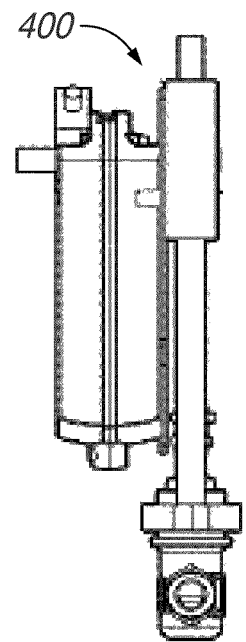
Figure 18:
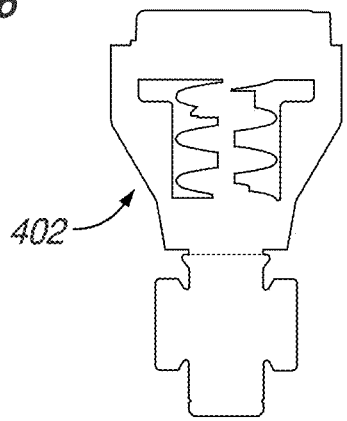
Figure 19:
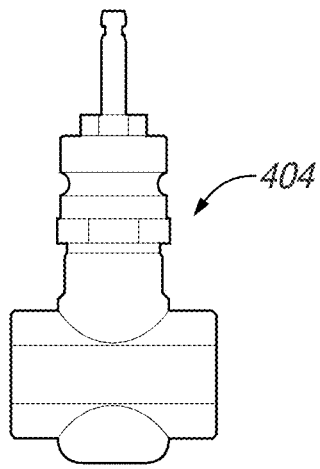
Figure 20:
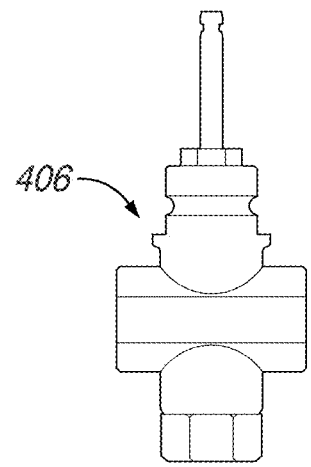

The ERV 115 takes in return air 115RA and sends it back into the ventilation system 100 as supply air 115SA. As shown in FIG. 11, the ERV 115 of can, but is not required to, include an inlet hood 115IH with a birdscreen, an inlet air damper 115IAD, a filter section 115FS, a plenum section 115PS, a face & bypass exchanger 115FBD, a blower motor section 115BMS (also shown in FIG. 13), a gravity relief 115GR for a single blade, a damper motor enclosure 115DME (also shown in FIG. 13), and an exit hood 115EH. As shown in FIG. 12, the ERV 115 can, but is not required to, include an air to air exchanger 115EX, an electrical panel 115EP, a positive pressure deluxe door 115DD, and a service receptacle 115SR. As shown in FIG. 13, the ERV 115 can, but is not required to, include a coil section 115CS and a pipe chase 115PC. However, if it is necessary for humans to occasionally occupy the space, the ventilation system 100 can also be installed with ancillary heating/cooling options, such as an electric, gas, etc. heater that can be turned on for periods of time when individuals may be using the space. An exemplary split system air condition and supplemental cooling system 200 is shown in FIG. 14. An infrared supplemental heating system 300 is shown in FIG. 15. The infrared supplemental heating system 300 can be, but is not required to be, equipped with one or more of the following components (ordered from the lefthand side of the figure to the right): a powercord connection 302, a fitted intake collar 304, a black enameled steel burner control box with an ABS plastic cover 306, a tool-free serviceability while operating access panel 308, a reliable hot surface ignition 310, a sight glass for burner inspection 312, a reflector end caps with clips 314, tube hangers 316, highly polished aluminum reflectors 318, and interlocking swaged radiant tubes 320. This can significantly reduce energy usage and operating costs while alleviating man-made acceleration of climate change.

To help facilitate moving air through the pipes 106/108, an intake fan 116 to pull said air through the pipes 106/108 to the ventilated space 122. Similarly, an exhaust fan 118 can help push air that has been within the building 122 for some time back into the environment 124 to help facilitate the continuous ventilation of air through the building 122. The exhaust fan 118 is preferably installed at a different location in the building 122, such as a location on an opposite side of the building from the intake fan 116. Therefore, the primary use of energy in the ventilation system 100 and moving parts located therewithin are a result of running the fan system 116/118 that is used to pull air through the pipes and through the ventilated space 122.

In some embodiments, the intake fan 116 and/or exhaust fan 118 is a cross-flow or tangential fan, sometimes known as a tubular fan. Such fans are often used in heating, ventilation, and air conditioning (HVAC) systems, especially in ductless split air conditioners. The fan can be long concerning the diameter, so the flow remains approximately two-dimensional away from the ends. The cross-flow fan can employ an impeller with forward-curved blades and/or placed in a housing consisting of a rear wall and a vortex wall. In other embodiments, the intake fan 116 and/or exhaust fan 118 can be an axial-flow fans have blades that force air to move parallel to the shaft about which the blades rotate.

To further help facilitate air moving through the pipes, the ventilation system 100 and/or fans 116/118 themselves can include valves, louvers, and/or at least one other type of fluid gate that allows air being ventilated to bypass at least one sections of the pipes 106/108. For example, the valves employed can control air flow into one or more section of the pipes 106/108, can include stall protection (e.g., by employing a brushless DC motor), can include a bi-directional fail-spring spring return, and be housed within an all-metal housing for durability. The valves can be used to used to control water and glycol solutions to 50 percent in small to large air handling units and central plant applications.

An exemplary series rack and pinion valve system 400 is shown in FIGS. 16-20. The series rack and pinion valve system 400 includes an actuator 402, as shown in detail in FIG. 18, and a valve. The valve can, for example, be a two-way female NPT×female NPT (F×F) valve 404, as shown in detail in FIG. 19. In yet another example, the valve can be a three-way female NPT×female NPT (F×F) valve 406, as shown in detail in FIG. 20.

Figure 21:
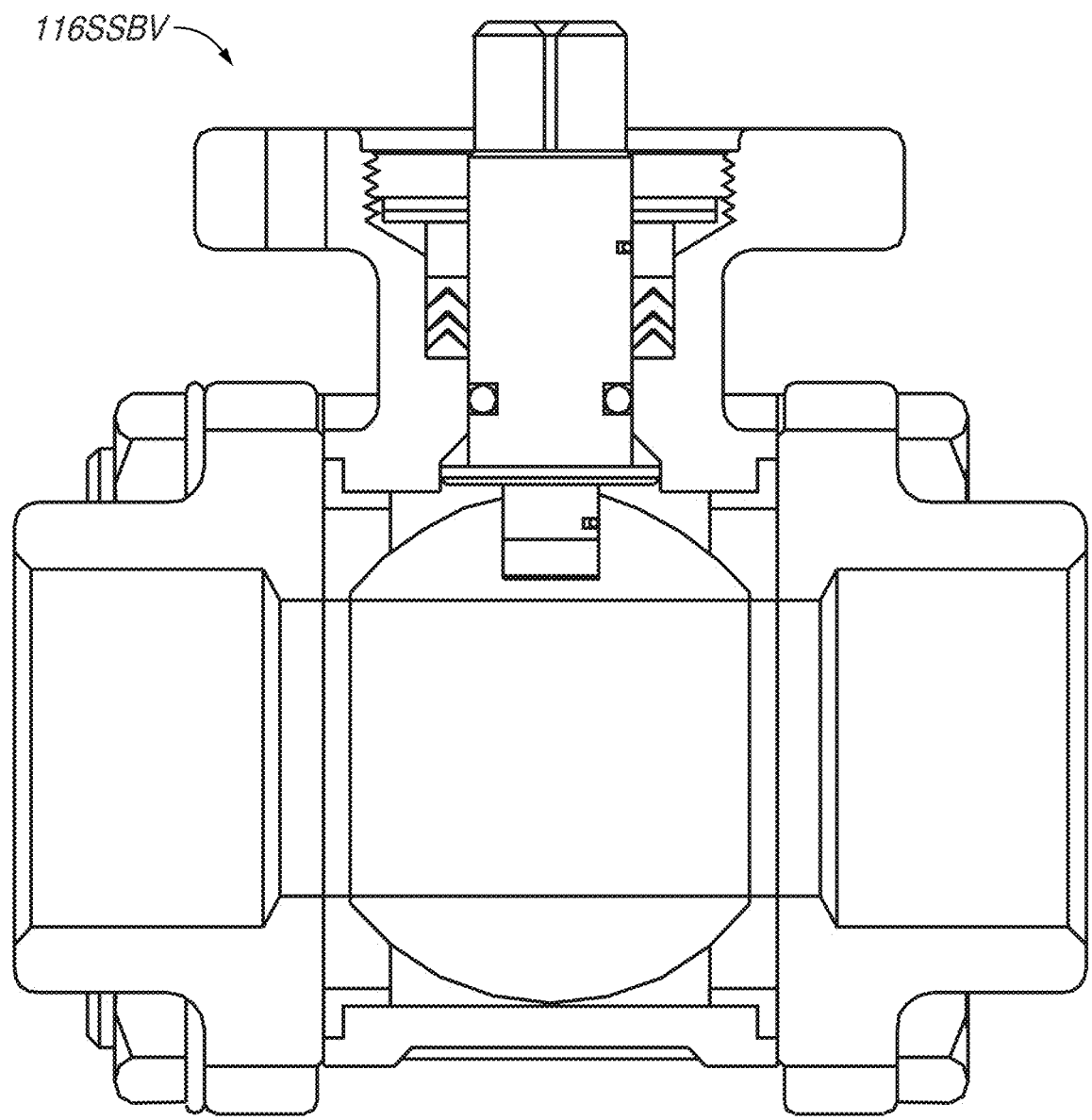
FIG. 21 shows a non-limiting example of a stainless steel ball valve that can be implemented within the ventilation system described herein, according to some aspects of the present disclosure.
Figure 22:
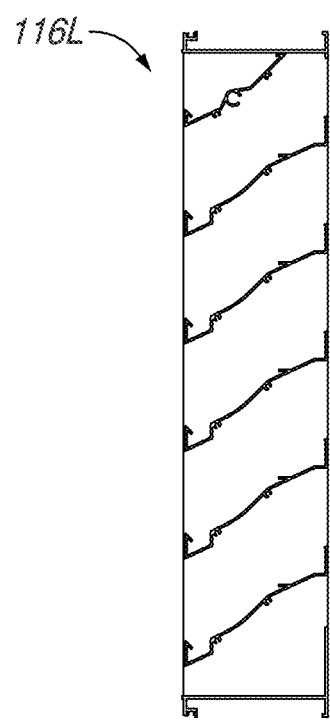
FIGS. 22-25 shows a non-limiting example of louvers that can be implemented within the ventilation system described herein, according to some aspects of the present disclosure.
Figure 23:
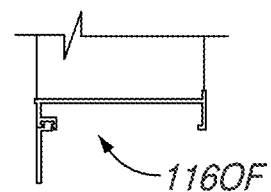
Figure 24:
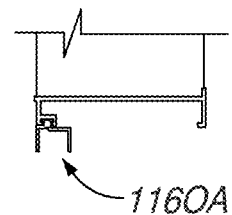
Figure 25:
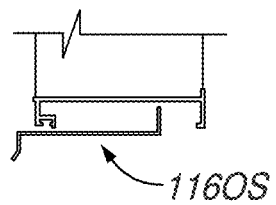
Figure 26:
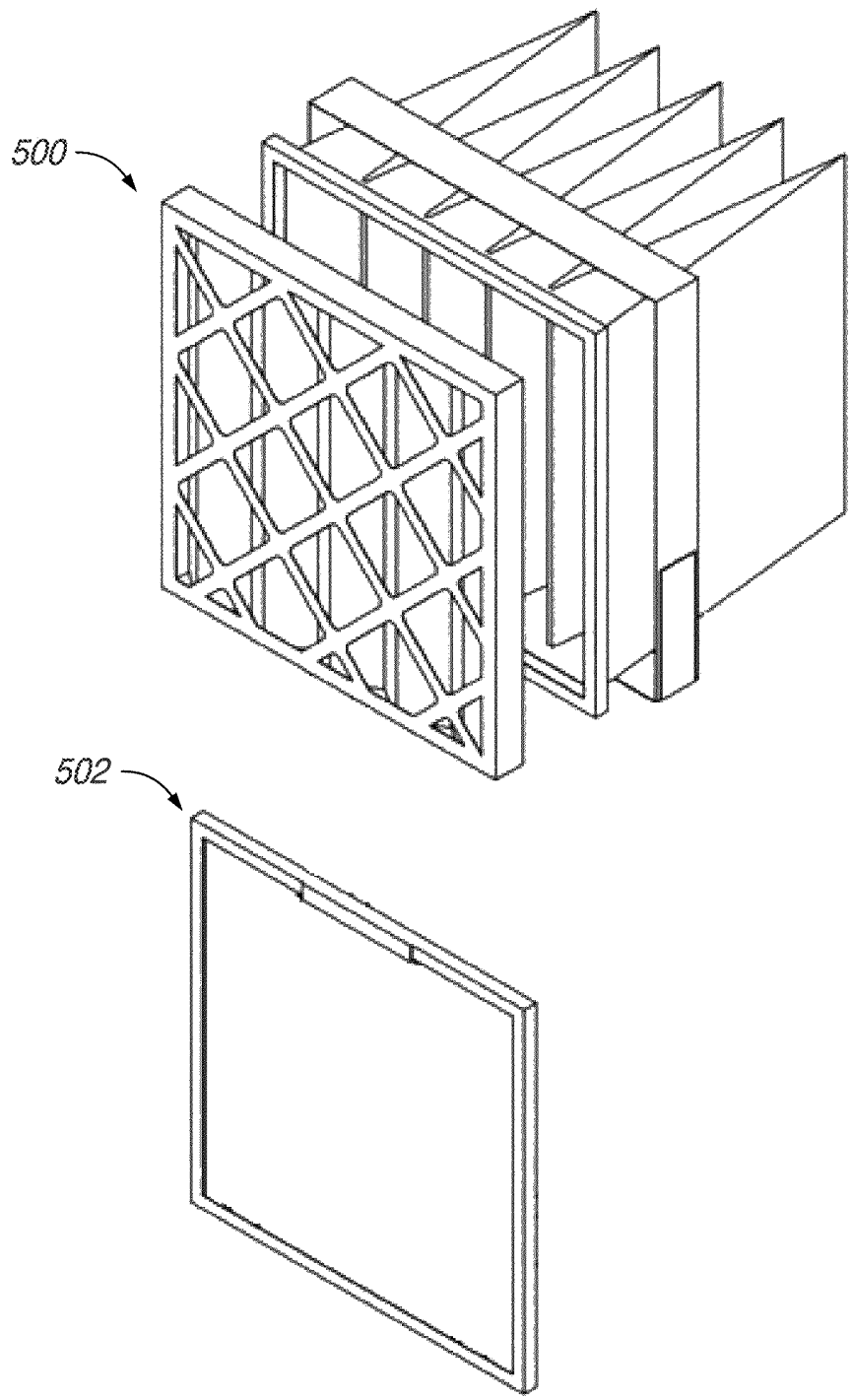
FIG. 26 shows a non-limiting example of a filter and filter frame that can be implemented within the ventilation system described herein, according to some aspects of the present disclosure.

A stainless steel ball valve 116SSBV is another example of such a valve, louver, and/or at least one other type of fluid gate that allows air being ventilated to bypass at least one sections of the pipes 106/108, and is shown in FIG. 21. Likewise, the louver 116L is another example of such a valve, louver, and/or at least one other type of fluid gate that allows air being ventilated to bypass at least one sections of the pipes 106/108, and is shown in FIG. 22. The louver 116L can include a flange 116OF (FIG. 23), a glazing adapter 116OA (FIG. 24), and/or an extended sill 116OS (FIG. 25).

The use of sections of pipes 106/108 rather than one continuous pipe can help facilitate maintenance of same. The system 100 can be further configured so as to be still operational in the event one or more sections need maintenance. In some cases, such as when operating the system while outdoor air is hot and humid, the below-ground piping 108 is further installed with condensate drain collection and pipe cleaning brush to drain any collected water and prevent mold growth. This helps reduce the need more other major types of maintenance and can help longevity of the pipes 106/108.

Furthermore, it is to be appreciated the ventilation system 100 can also be operated with air filters on incoming or outgoing air, odor control, dehumidification and conditioning, and other air quality control measures. For example, filters 400 can be used for the removal of larger particulates, such as lint and other bulky contaminants, without restricting the airflow through the media. The media is designed to face-load and will not pack down, gap or separate. Said filters 400 can be constructed of an electro-galvanized steel media mesh, assembled into alternating layers of corrugated and flat layers and enclosed in a 20-gauge galvanized steel frame 402. The media layers can be permanently fastened together to ensure media rigidity and ensure that the media pack does not compress ensuring long life within the ventilation system 100. The enclosing frame 402 can have flush mitered corners, reinforced by a die-formed inverse bead, to add rigidity and filter life. The filter bottom can include drain holes for drainage during cleaning.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 100 | ventilation system |
| 102 | outside air inlet of pipes |
| 104 | flexible pipe, such as an elbow |
| 104A | gored elbow |
| 104B | pleated elbow |
| 104C | die-stamped elbow |
| 104D | mitered elbow with vanes |
| 104E | heel-tapped elbow |
| 104F | straight tee |
| 104G | conical tee |
| 104H | straight lateral |
| 104I | tapered lateral |
| 104J | straight cross |
| 104K | conical cross |
| 104L | lateral cross |
| 104M | vee |
| 104N | bullhead tee with vanes |
| 104O | tapered Y-branch |
| 104P | Y-branch |
| 104Q | offset |
| 104R | square-to-round |
| 104S | straight contour flanged tap |
| 104T | straight saddle tap |
| 104U | conical contour flanged tap |
| 104V | conical saddle tap |
| 104W | conical tap off flat |
| 104X | reducer |
| 104Y | lateral contour flanged tap |
| 104Z | lateral saddle tap |
| 104AA | straight tap off flat |
| 104BB | rectangular tap |
| 106 | vertically oriented pipe/tube |
| 107 | plates |
| 108 | horizontally oriented pipe/tube |
| 109 | fins |
| 110 | depth |
| 111 | dampers |
| 111B | blade |
| 111FM | flange-mount |
| 111J | jamb |

TABLE 1-continued

| List of Reference Characters | |
|---|---|
| 111TB | thermal break |
| 112 | ventilated air outlet from pipes |
| 113G | grille |
| 113R1 | first exemplary register |
| 113R2 | second exemplary register |
| 113R3 | third exemplary register |
| 114 | direct ventilation bypass duct with fluid inlet in an outdoor space |
| 115 | energy recovery ventilator (ERV) |
| 115BMS | blower motor section |
| 115CS | coil section |
| 115DME | damper motor enclosure |
| 115DD | positive pressure deluxe door |
| 115EP | electrical panel |
| 115EH | exit hood |
| 115EX | air to air exchanger |
| 115FBD | face & bypass damper |
| 115FS | filter section |
| 115GR | gravity relief for single blade |
| 115IAD | inlet air damper |
| 115IH | inlet hood |
| 115PC | pipe chase |
| 115PS | plenum section |
| 115RA | return air |
| 115SR | service receptacle |
| 115SA | supply air |
| 116 | intake fan, valves, and louvers |
| 116L | louver |
| 116OA | optional glazing adapter |
| 116OF | optional flange |
| 116OS | optional extended sill |
| 116SSBV | stainless steel ball valve |
| 118 | exhaust fan |
| 120 | fluid outlet to environment |
| 122 | building |
| 124 | environment |
| 126 | outdoor space with ambient air |
| 200 | split system air condition and supplemental cooling system |
| 300 | infrared supplemental heating system |
| 302 | powercord connection |
| 304 | fitted intake collar |
| 306 | black enameled steel burner control box with an ABS plastic cover |
| 308 | tool-free serviceability while operating access panel |
| 310 | reliable hot surface ignition |
| 312 | sight glass for burner inspection |
| 314 | reflector end caps with clips |
| 316 | tube hangers |
| 318 | highly polished aluminum reflectors |
| 320 | interlocking swaged radiant tubes |
| 400 | series rack and pinion valves |
| 402 | actuator |
| 404 | two-way female NPT × female NPT (F × F) valve |
| 406 | three-way female NPT × female NPT (F × F) valve |
| 500 | filter |
| 502 | filter frame |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A ventilation system comprising:
   at least one fluid inlet located in an outdoor space with ambient air;
   parallelly oriented pipes, said pipes:
      being joined by at least one flexible pipe;
      comprising modular sections joined by said at least one flexible pipe, whereby the modular sections of the pipes can be isolated for maintenance;
      including internal plates or fins installed in an interior of the pipes;
      buried below ground at a depth within the earth at location where the ground temperature is between thirty-five and sixty-five degrees Fahrenheit year-round;
      configured to route air from the at least one fluid inlet at the outdoor space to a fluid outlet at a space to be ventilated; and
   an intake fan to pull said air through the pipes to the ventilated space;
   wherein heat exchange through walls of the pipes with the surrounding earth is increased via the internal plates or fins, and the ventilation system is configured to provide at least twelve air changes per hour within the ventilated space.

2. The ventilation system of claim 1 further comprising:
   an above-ground bypass duct that directly ventilates outside air to the ventilated space.

3. The ventilation system of claim 1 further comprising:
   at least one fluid gate that allows air to be ventilated to bypass at least one sections of the pipes.

4. The ventilation system of claim 1 wherein the pipes comprise a material selected from the group consisting of:
   (i) steel;
   (ii) polyvinyl chloride (PVC);
   (iii) ductile iron; and
   (iv) high density poly ethylene (HDPE).

5. The ventilation system of claim 1 wherein the pipes comprise a diameter of between three and two hundred forty inches.

6. The ventilation system of claim 1 wherein each of the pipes comprises a length of between five and ten thousand feet.

7. The ventilation system of claim 1 wherein at least two of the parallelly oriented pipes are horizontally oriented and the depth is at least two feet underground.

8. The ventilation system of claim 7 further comprising a vertically oriented pipe perpendicularly oriented to said horizontally oriented pipes and wherein at least one portion of said pipes reaches the depth that is at least twenty feet underground.

9. The ventilation system of claim 1 further comprising a condensate drain collector and a pipe cleaning brush.

10. The ventilation system of claim 1 further comprising an exhaust fan to return at least some air within the ventilated space to the environment, wherein a type of the intake fan and a type of the exhaust fan are selected from the group consisting of:
    (i) axial flow; and
    (ii) cross-flow.

11. A method for ventilating air in an unoccupied facility space comprising:
    intaking air from the environment using a fan at a flow rate sufficient to completely replace air within the facility space at least twelve times per hour;
    passing said air through pipes buried to a depth beneath earth that has a year-round temperature of a range between thirty five degrees Fahrenheit (35° F.) and sixty-five degrees Fahrenheit (65° F.), the pipes including internal fins to enhance heat transfer between the air and the surrounding earth, said pipes extending for a length such that heat exchanged through the pipe walls with the surrounding earth will heat and/or cool the air to a temperature within the range;
    delivering said air of the temperature within the range to a nearby building to be ventilated;
    removing condensate from the pipes to protect the pipes from excessive moisture and to prevent mold growth; and
    returning at least some air within the building to the environment.

12. The method of claim 11 further comprising:
    automatically operating the ventilation system with direct ventilation when outdoor air is above freezing.

13. The method of claim 11 further comprising:
    sensing a temperature of the air within the building.

14. The method of claim 11 further comprising:
    completely changing the air within the building at least once every five minutes.

15. The method of claim 11 further comprising installing the pipes using a step selected from the group consisting of:
    (i) directional drilling; and
    (ii) trench installation.

16. The method of claim 11 further comprising fireproofing the pipes.

17. The method of claim 11 further comprising:
    wherein when the outdoor air falls to a temperature below freezing, heating said air in a ventilated space within the building without use of indirect gas fired heating, heat recovery ventilation (HRV), or an energy recovery ventilator (ERV).

18. The method of claim 11 further comprising filtering the air prior to delivering said air of the temperature within the range to the building.

\* \* \* \* \*